United States Patent
Lidman et al.

(10) Patent No.: US 8,909,752 B1
(45) Date of Patent: Dec. 9, 2014

(54) SYSTEMS AND METHODS FOR ASSOCIATING DATA WITH ADVERTISEMENTS

(75) Inventors: Filip Lidman, Dublin (IE); Christoffer Lotebo, Dublin (IE)

(73) Assignee: Google Inc., Mountain View, CA (US)

( * ) Notice: Subject to any disclaimer, the term of this patent is extended or adjusted under 35 U.S.C. 154(b) by 77 days.

(21) Appl. No.: 13/282,316

(22) Filed: Oct. 26, 2011

(51) Int. Cl.
*G06F 15/173* (2006.01)

(52) U.S. Cl.
USPC ..... 709/223; 705/14.4; 705/14.49; 705/14.55

(58) Field of Classification Search
USPC ..................... 709/206, 204; 705/14
See application file for complete search history.

(56) References Cited

U.S. PATENT DOCUMENTS

| | | | |
|---|---|---|---|
| 7,870,026 B2 | 1/2011 | Krishnan et al. | |
| 2010/0057743 A1* | 3/2010 | Pierce | 707/10 |
| 2010/0257023 A1* | 10/2010 | Kendall et al. | 705/10 |
| 2010/0332304 A1* | 12/2010 | Higgins et al. | 705/14.16 |
| 2012/0054189 A1* | 3/2012 | Moonka et al. | 707/740 |
| 2012/0072284 A1* | 3/2012 | Wang et al. | 705/14.53 |
| 2012/0226564 A1* | 9/2012 | Mirrokni Banadaki et al. | 705/14.66 |
| 2012/0258501 A1* | 10/2012 | Bauer et al. | 435/91.2 |
| 2012/0278164 A1* | 11/2012 | Spivack et al. | 705/14.52 |
| 2012/0290399 A1* | 11/2012 | England et al. | 705/14.66 |
| 2013/0066700 A1* | 3/2013 | Portnoy et al. | 705/14.23 |
| 2013/0066876 A1* | 3/2013 | Raskino et al. | 707/741 |

* cited by examiner

*Primary Examiner* — Douglas W Owens
*Assistant Examiner* — Monica C King
(74) *Attorney, Agent, or Firm* — McDermott Will & Emery LLP

(57) ABSTRACT

Systems and methods for associating data with advertisements include storing a relationship between a first user and a second user in a memory, receiving an identification of user data from a first user of a website, assigning interest data for the second user based on the identified user data from the first user, associating the interest data with advertisements provided by an advertiser, and providing display data representing the advertisements associated with the interest data to the second user.

19 Claims, 5 Drawing Sheets

SYSTEMS AND METHODS FOR ASSOCIATING DATA WITH ADVERTISEMENTS

BACKGROUND

The present disclosure relates generally to associating data with advertisements, and more particularly, to improving relevancy of advertisements.

The Internet provides access to a wide variety of content. For instance, images, audio, video, and web pages for many different topics are accessible through the Internet. The accessible content provides an opportunity to present advertisements to users. Advertisements may be placed within content, such as a web page, image or video, or the content may trigger the display of one or more advertisements, such as presenting an advertisement in an advertisement slot within the content and/or in an advertisement slot of a pop-up window or other overlay. Advertisements may also be identified and provided through interest data selected by users.

In an example, a user may identify user data for a second user. The user data from the first user may be assigned as interest data to a second user. The interest data may be associated with advertisements, and display data, representing the advertisements, may be provided to the second user.

SUMMARY

Implementations of the systems and methods for associating data with advertisements are described herein. One implementation is a method including a processing circuit configured to store a relationship between a first user and a second user in a memory. The method may also include a processing circuit configured to receive an identification of user data from a first user of a website. The method may further include a processing circuit configured to assign interest data for the second user based on the identified user data from the first user. The method may also include a processing circuit configured to associate the interest data with advertisements provided by an advertiser. The method may include a processing circuit configured to provide display data representing the advertisements associated with the interest data to the second user.

Another implementation is a system including a processing circuit configured to store a user profile for a second user, the user profile comprising user profile data. The system may also include a processing circuit configured to store a relationship between a first user and the second user. The system may further include a processing circuit configured to receive from the first user user profile data for the second user and storing the received user profile data in the user profile for the second user. The system may also include a processing circuit configured to select an advertisement from an advertisement database based on the user profile data received from the first user. The system may include a processing circuit configured to provide display data comprising the selected advertisement to the second user.

Another implementation is a method for advertising over a computer network that may include receiving, by an advertisement server computer, an advertisement request requesting an advertisement for delivery to a second user. The method may also include selecting by the advertisement server computer, an advertisement from an advertisement database to provide to a second user in response to the advertising request based on a second user user profile data, wherein the second user user profile data is based on preferences of the second user and data received from a first user.

These implementations are mentioned not to limit or define the scope of the disclosure, but to provide an example of an implementation of the disclosure to aid in understanding thereof. Particular implementations may be developed to realize one or more of the following advantages.

The details of one or more implementations of the disclosure are set forth in the accompanying drawings and the description below. Other features, aspects, and advantages of the disclosure will become apparent from the description, the drawings, and the claims.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Content providers (e.g., advertisers) may want to increase the number of user interactions with the content. Each user interaction may include a number of dimensions, which may include data associated with the user interaction. Advertisers are concerned with relevancy, performance parameters (e.g., click-through rate (CTR), conversion rate, etc.), price parameters, and other factors.

According to some implementations, a more relevant advertisement may be provided to enhance web experiences by the users. In turn, the more relevant advertisement leads to better performance for the advertisers using their respective factors. According to some implementations, the interactivity and engaging nature of allowing users to take part in the advertising selection leads to a better overall internet experience for users and for advertisers.

The terms "first user" and "second user" are used for simplification and clarity and are not intended to be limiting. It is understood that multiple users may be identified as a first user and/or a second user.

Figure 1:
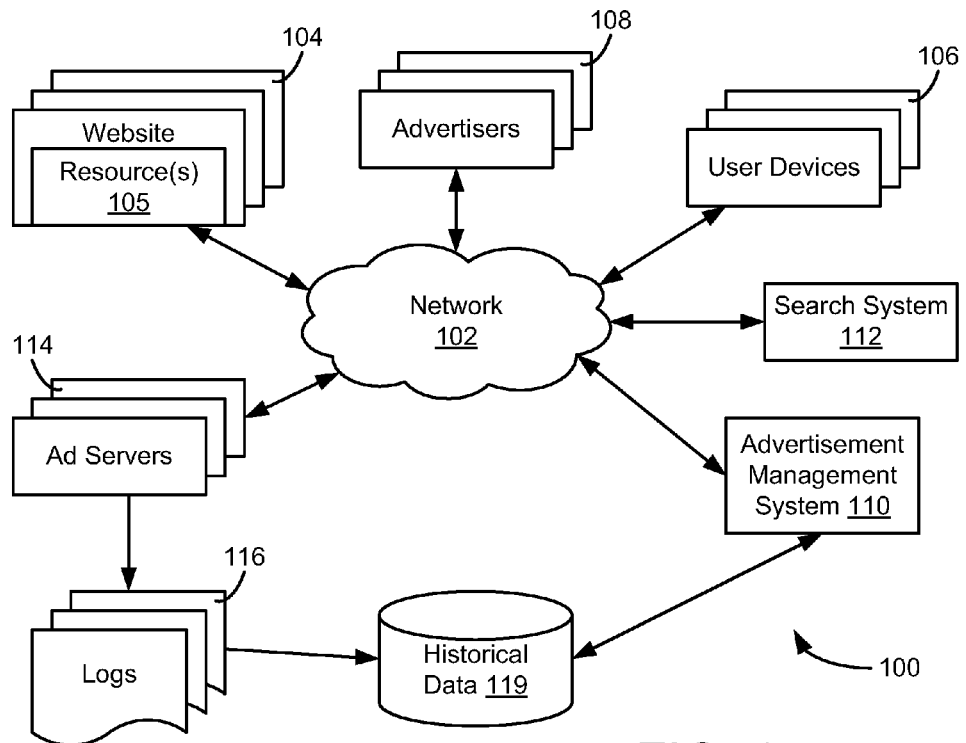
FIG. 1 is a block diagram of an example environment in which an advertisement management system manages advertising services in accordance with a described implementation.

Referring to FIG. 1, a block diagram of an example environment in which an advertisement management system manages advertising services is shown in accordance with a described implementation. The example environment 100 includes a network 102, such as a local area network (LAN), a wide area network (WAN), the Internet, or a combination thereof. The network 102 connects websites 104, user devices 106, advertisers 108, and an advertisement management system 110. The example environment 100 may include many thousands of websites 104, user devices 106, and advertisers 108.

A website 104 includes one or more resources 105 associated with a domain name and hosted by one or more servers. An example website is a collection of web pages formatted in hypertext markup language (HTML) that may contain text, images, multimedia content, and programming elements, such as scripts.

A resource 105 is any data that may be provided over the network 102. A resource 105 is identified by a resource address that is associated with the resource 105, such as a uniform resource locator (URL). Resources 105 may include web pages, word processing documents, portable document format (PDF) documents, images, video, programming elements, interactive content, and feed sources, to name only a few. The resources 105 may include content, such as words, phrases, images and sounds, that may include embedded information (such as meta-information in hyperlinks) and/or embedded instructions. Embedded instructions may include code that is executed at a user's device, such as in a web browser. Code may be written in languages, such as, JavaScript® or ECMAScript®.

A user device 106 is an electronic device that is under control of a user and is capable of requesting and receiving resources 105 over the network 102. Example user devices 106 include personal computers, mobile communication devices, and other devices that may send and receive data over the network 102. A user device 106 typically includes a user application, such as a web browser, to facilitate the sending and receiving of data over the network 102.

A user device 106 may request resources 105 from a website 104. In turn, data representing the resource 105 may be provided to the user device 106 for presentation by the user device 106. The data representing the resource 105 may include data specifying a portion of the resource or a portion of a user display (e.g., a presentation location of a pop-up window or in a slot of a web page) in which advertisements may be presented. These specified portions of the resource 105 or user display are referred to as advertisement slots.

To facilitate searching of the vast number of resources 105 accessible over the network 102, the environment 100 may include a search system 112 that identifies the resources 105 by crawling and indexing the resources 105 provided on the websites 104. Data about the resources 105 may be indexed based on the resource 105 with which the data is associated. The indexed and, optionally, cached copies of the resources 105 are stored in a search index (not shown).

User devices 106 may submit search queries to the search system 112 over the network 102. In response, the search system 112 accesses the search index to identify resources 105 that are relevant to the search query. In one illustrative embodiment, a search query includes one or more keywords. The search system 112 identifies the resources 105 that are responsive to the query, provides information about the resources 105 in the form of search results and returns the search results to the user devices 106 in search results pages. A search result may include data generated by the search system 112 that identifies a resource 105 that is responsive to a particular search query, and may include a link to the resource 105. An example search result may include a web page title, a snippet of text or a portion of an image extracted from the web page 104, a rendering of the resource 105, and the URL of the web page 104. Search results pages may also include one or more advertisement slots in which advertisements may be presented.

A search result page may be sent with a request from the search system 112 for the web browser of the user device 106 to set an HTTP (HyperText Transfer Protocol) cookie. A cookie may represent, for example, a particular user device 106 and a particular web browser. For example, the search system 112 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent page request to the same server or a server within the domain of the server will include the cookie. The cookie may store a variety of data, including a unique or semi-unique identifier. The unique or semi-unique identifier may be anonymized and is not connected with user names. Because HTTP is a stateless protocol, the use of cookies allows an external service, such as the search system 112 or other system, to track particular actions and status of a user over multiple sessions. A user may opt out of tracking user actions, for example, by disabling cookies in the browser's settings.

When a resource 105 or search results are requested by a user device 106 or provided to the user device 106, the advertisement management system 110 receives a request for advertisements to be provided with the resource 105 or search results. The request for advertisements may include characteristics of the advertisement slots that are defined for the requested resource 105 or search results page, and may be provided to the advertisement management system 110. For example, a reference (e.g., URL) to the resource 105 for which the advertisement slot is defined, a size of the advertisement slot, and/or media types that are available for presentation in the advertisement slot may be provided to the advertisement management system 110. Similarly, keywords (i.e., one or more words that are associated with content) associated with a requested resource 105 ("resource keywords") or a search query for which search results are requested may also be provided to the advertisement management system 110 to facilitate identification of advertisements that are relevant to the resource 105 or search query.

The request for advertisement(s) may include an identification of user data from a first user of a website, which may be provided to the advertisement management system 110. The first user may be part of an online community and/or have an online presence or account (e.g., social media sites such as Google+, LinkedIn, Facebook, Twitter, etc.). For example, the first user may identify user data for a second user, e.g., that the second user enjoys soccer. The advertisement management system 110 may assign interest data to the second user based on the first user's identification of user data and associate the interest data with advertisements provided by an advertiser. The advertisement management system 110 may associate content (e.g., keywords, pictures, videos, etc.) with the interest data to provide advertisements that are relevant to the second user.

Based on data included in the request for advertisements, the advertisement management system 110 may provide advertisements that are eligible to be provided in response to the request ("eligible advertisements"). For example, eligible advertisements may include advertisements having characteristics matching the user data identified by the first user. In some implementations, eligible advertisements may include advertisements that match the characteristics of the second user. In some implementations, eligible advertisements may include advertisements deemed relevant by the second user, etc.

The advertisement management system 110 selects an eligible advertisement for each advertisement slot of a resource 105 (e.g., profile of a user on a website) or of a search results page. The advertisement management system 110 may select the eligible advertisement from an advertisement database. The advertisement database may be a cloud database in communication with the advertisement management system. The resource 105 or search results page is received by the user device 106 for presentation by the user device 106. User interaction data representing user interactions with presented advertisements may be stored in a historical data store 119. For example, when an advertisement is presented to the user via an ad server 114, data may be stored in a log file 116. This log file 116, as more fully described below, may be aggregated with other data in the historical data store 119. Accordingly, the historical data store 119 contains data representing the advertisement impression. For example, the presentation of an advertisement is stored in response to a request for the advertisement that is presented. For example, the ad request may include data identifying a particular cookie, such that data identifying the cookie may be stored in association with data that identifies the advertisement(s) that were presented in response to the request. In some implementations, the data may be stored directly to the historical data store 119.

Similarly, when a user selects (e.g., clicks, touches, signals, etc.) a presented advertisement, data representing the selection of the advertisement may be stored in the log file 116, a cookie, or the historical data store 119. In some implementations, the data is stored in response to a request for a web page that is linked to by the advertisement. For example, the user selection of the advertisement may initiate a request for presentation of a web page that is provided by (or for) the advertiser. The request may include data identifying the particular cookie for the user device, and this data may be stored in the advertisement data store.

User interaction data may be associated with unique identifiers that represent a corresponding user device with which the user interactions were performed. For example, in some implementations, user interaction data may be associated with one or more cookies. Each cookie may include content which specifies an initialization time that indicates a time at which the cookie was initially set on the particular user device 106.

The log files 116, or the historical data store 119, also store references to advertisements and data representing conditions under which each advertisement was selected for presentation to a user. For example, the historical data store 119 may store targeting keywords, bids, and other criteria with which eligible advertisements are selected for presentation. Additionally, the historical data store 119 may include data that specifies a number of impressions for each advertisement and the number of impressions for each advertisement may be tracked, for example, using the keywords that caused the advertisement impressions and/or the cookies that are associated with the impressions. Data for each impression may also be stored so that each impression and user selection may be associated with (i.e., stored with references to and/or indexed according to) the advertisement that was selected and/or the targeting keyword that caused the advertisement to be selected for presentation.

The user interaction data may be used to identify something of value for the first user based on the interaction. For example, when the second user interacts with an advertisement(s) (highlights, clicks, saves, etc.), the interaction with the advertisement(s) is stored in the log file 116, a cookie, the historical data store 119, etc. In some implementations, the data may be stored in the first user's user profile data, first user's user device, etc. Based on the interaction by the second user, the first user may be provided with a credit.

Figure 2:
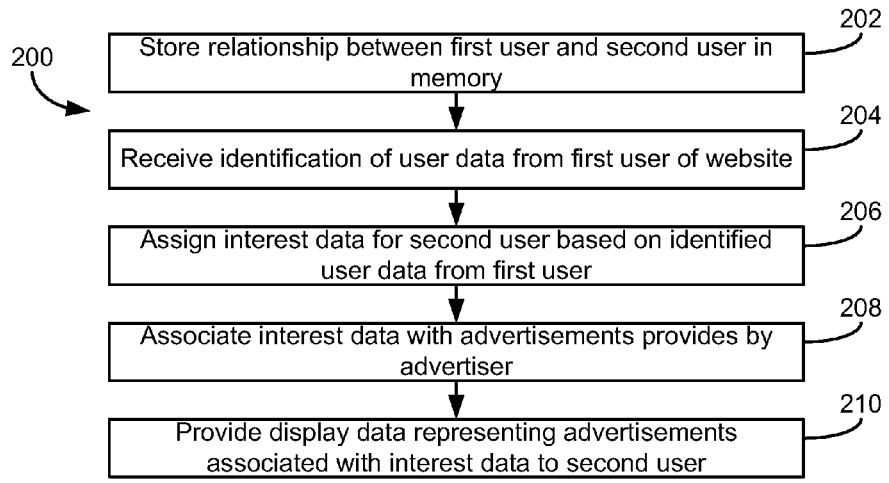
FIG. 2 is a flow diagram of a method for providing display data representing advertisements associated with interest data in accordance with a described implementation.

Referring to FIG. 2, a flow diagram of a method for providing display data representing advertisements associated with interest data is shown in accordance with a described implementation. The method 200 is provided by way of example, as there are a number of ways to carry out the methods according to the present disclosure. The method 200 shown in FIG. 2 may be executed or otherwise performed by one of a combination of various systems. The method may be implemented by a computer, a computer program product, a computer program, a client, a server, a client-server relationship, etc. The method 200 is described herein as carried out by the system 100 of FIG. 1, by way of example.

The example method begins at block 202, in which a relationship is stored between a first user and a second user in memory. A first user may be defined to include multiple users. In some implementations, the relationship may be a group relationship, a content-based relationship, a social relationship, combinations thereof, etc. The relationship may be defined by an online community, e.g., circles, friends, followers, connections, etc.

At block 204, an identification of user data is received from a first user of a website. In some implementations, the website may be a social networking website, e.g., Google+, Facebook, LinkedIn, etc. In some implementations, the identification of user data may comprise reading or scanning a message sent by a user using a social networking website. The message may be viewable by a second user. In some implementations, a user may send a message to the second user (e.g., newsfeed, private message, etc.), to the website (e.g., Google+, Facebook, etc.). For example, the message may include directions that the second user should see advertisements related to golf. The message may direct the second user to like golf, to follow a hyperlink to a golf site, etc.

The identification of user data may include an interest in a user profile of the first user stored in memory. For example, the user may identify golf for a second user, which may be stored in the user profile of the first user as an interest, possible interest, metadata, etc. The interest may also be stored as a credit to the first user for identifying data that the second user may be interested in. For example, the first user may receive a credit based on identifying user data for a second user. The credit may be stored in the user profile of the first user as a way of tracking and/or logging the interests that have been assigned to a second user based on the identification of user data by a first user.

Figure 3:
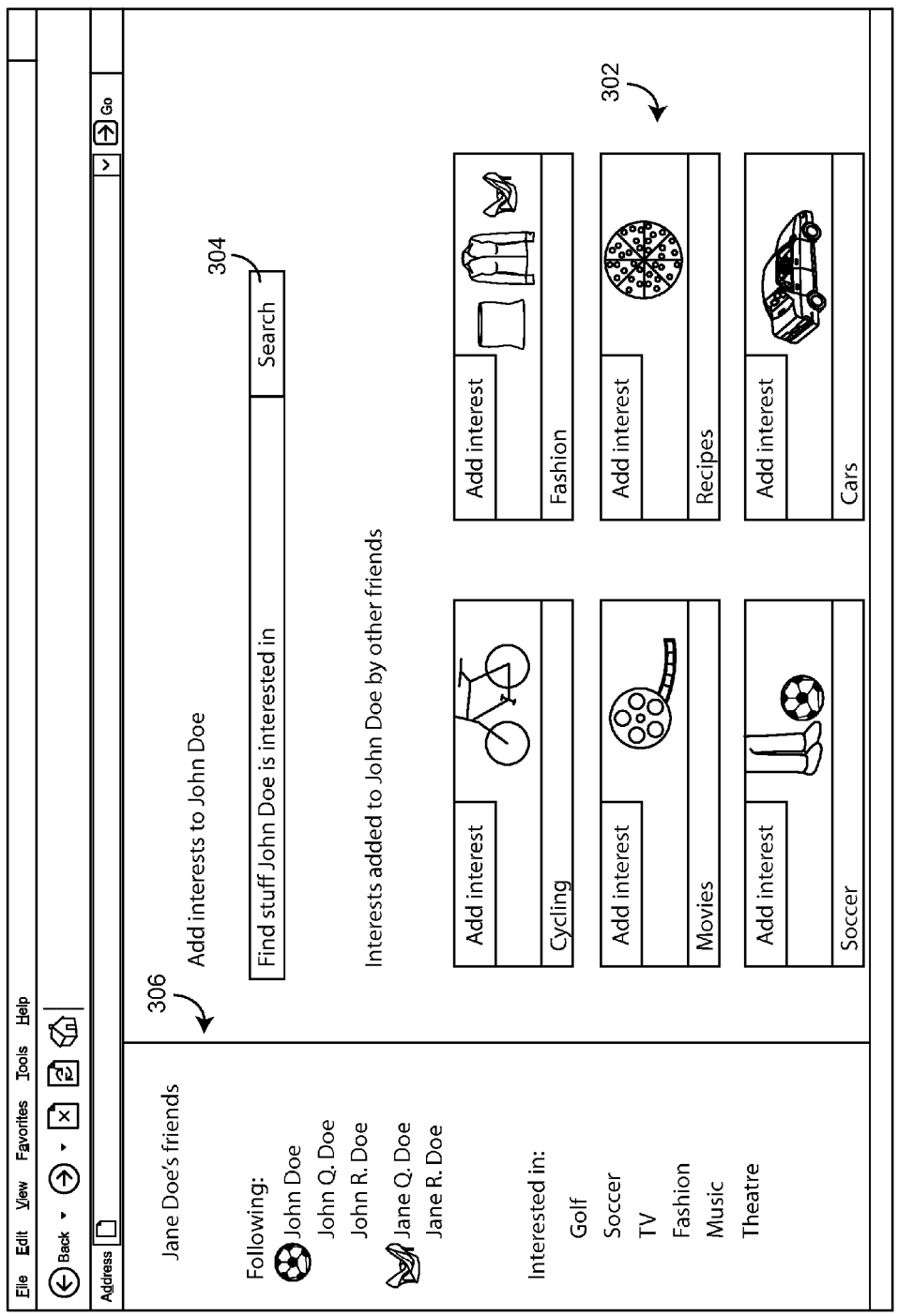
FIG. 3 illustrates identifying user data for a second user.

The identification of user data for a user is shown in illustrative form in FIG. 3. In FIG. 3, a user profile via a webpage 300 of a website is depicted. In some implementations, the website may be a social media site. "Social media site" is may include any website in which an online community may communicate or network using electronic message, posts, etc. (e.g., Blogger, Huffington Post, Google+, etc.). In FIG. 3, a first user (Jane Doe) is viewing a second user's profile (John Doe) via Jane Doe's profile page 306 via a user interface on web page 300. User Jane Doe may view a second user (John Doe) user data 302 by clicking, highlighting, hovering, etc. near his user name. In FIG. 3, John Doe's user data 302 is displayed to Jane Doe. Jane Doe may view user data that has already been identified for John Doe by other users 302.

Figure 4:
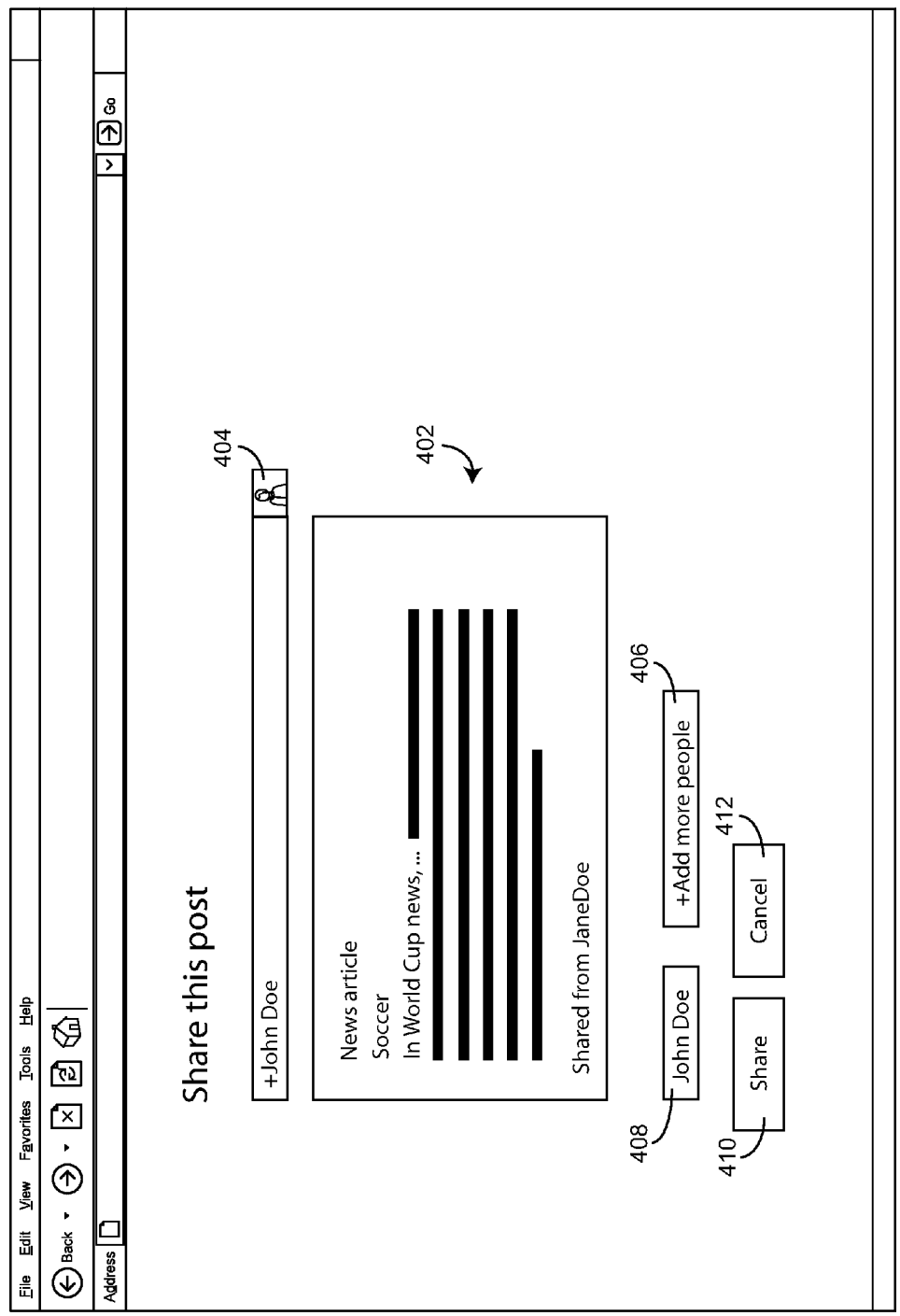
FIG. 4 illustrates shared interest data.

In FIG. 3, user data 302 for John Doe that has been identified includes interests such as cycling, fashion, movies, recipes, soccer and cars. In some implementations, the system may show to the first user an indication of who identified user data for the second user. Jane Doe may identify user data 302 for John Doe. In some implementations, Jane Doe may identify user data 302 as shown in FIG. 3 by using a search tool 304. Alternatively, the first user may identify user data by manipulating the second user user data via the first user's profile (e.g., using a drag and drop from an interest icon or field). For example, the first user may add a soccer icon next to the second user's name within the first user's profile 306. Alternatively, the first user may group the second user by user data. For example, the first user may create a soccer circle and place the second user within that circle. Additionally, the identification of user data may include providing user data, uploading user data, and sharing user data as shown in FIG. 4. These implementations are not intended as limiting as there are many ways that a first user may identify user data for a second user.

FIG. 4 illustrates shared user data in accordance with a described implementation. In FIG. 4, a first user (Jane Doe) user profile is shown. Jane Doe may have the ability to share user data with a second user (John Doe).

In FIG. 4, Jane Doe accesses her profile via a user interface 400. The user interface may be implemented at a client device. As shown, user interface 400 is implemented with a toolbar integrated into a browser. The first user may enter a second user or other users to share the post with by using the box 404. A set of dialog boxes or dropdown boxes may also be displayed where a user can type into the fields or select from the dropdown boxes to share the post. The first user may select box 408 to share the post with the second user. The first user may add more users with box 406. The user may finalize the share with box 410. The first user may cancel the share with box 412.

User data 402 may include any content that may be shared between a first user and a second user (e.g., videos, messages, documents, hyperlinks, etc.). In FIG. 4, Jane Doe is going to share a news article with John Doe and/or other people. After the user data 402 is shared, the user data 402 becomes assigned interest data for the second user.

Referring again to FIG. 2, in block 206 interest data for the second user is assigned based on the identified user data from the first user.

In some implementations, a weight of the interest data may be determined based on (1) identifying user data, (2) sharing user data, and/or (3) the input from a second user. The weight of the interest data may be stored in a memory in association with a second user user profile data. In some implementations, the weight of the interest data is used to determine whether the system associates the interest data with advertisements. The weight of the interest data may be used to determine whether to provide a credit to the first user.

In some implementations, (1) may be weighted according to a plurality of users identifying identical user data and (2) may be weighted according to a plurality of users that a first user shares content with. The weight of the interest data may be stored in an appropriate storage site (e.g., first user's user profile, second user's user profile, memory, mobile computing device, etc.). The weight may be determined in the following way:

If (input by the second user)
then (input by the second user)
If (no input by the second user),
then (1+2)

In some implementations, (1) may be determined by the number of users that identify user data. For example:

$$(1) = \text{\# of users that identified user data} * \text{factor} + (3)$$

The number of users may be the total number of users that identified user data. The number of users may be defined by the system, defined by the second user, etc. The number of users may be multiplied by a factor. In some implementations, the factor may be multiplied by the number of users that identify user data. The factor may be a parameter that is set by the system. For example, the system may determine that the relationship between the first user and the second user (e.g., spouse, sister, etc.), may warrant a higher factor that is multiplied by the number of users that identified user data. Another example may be a factor related to input by the second user. For example, if the second user agrees with first user's identification of user data 80% of the time, then the factor may be higher by 0.8. Alternatively, a factor may be decreased. For example, if the relationship between the first and the second user is defined by the system, the user(s), etc. as an "acquaintance", then the factor may be lower.

As noted above, the input by the second user may increase the factor by a certain amount. In some implementations, the input by the second user (3) may increase the weight of (1). For example, the input by the second user (3) may be an addend in the above equation. The input by the second user may negate the product of the # of users that identified user data * factor, thereby making the weight of (1) equal to zero.

In some implementations, (2) may be determined by the number of users that a first user shares user data with.

For example:

$$(2) = \text{factor}/\text{\# of users that a first user shares content with}$$

The factor may be determined by the system. For example, the system may determine that the relationship between the first user and the second user (e.g., spouse, sister, etc.), may warrant a higher factor that is multiplied by the number of users that identified user data. Another example may be a factor related to input by the second user. For example, if the second user agrees with first user's identification of user data 80% of the time, then the factor may be higher by 0.8. Alternatively, a factor may be decreased. For example, if the relationship between the first and the second user is defined by the system, the user(s), etc. as an "acquaintance", then the factor may be lower.

The number of users that the first user shares content may be a divisor in the above equation.

For example, if the first user shares interest data to only the second user, then the weight of (2) will be greater. If the first user shares identical data to multiple users, e.g., 10 users, then the weight of (2) will be x/10.

Figure 5:
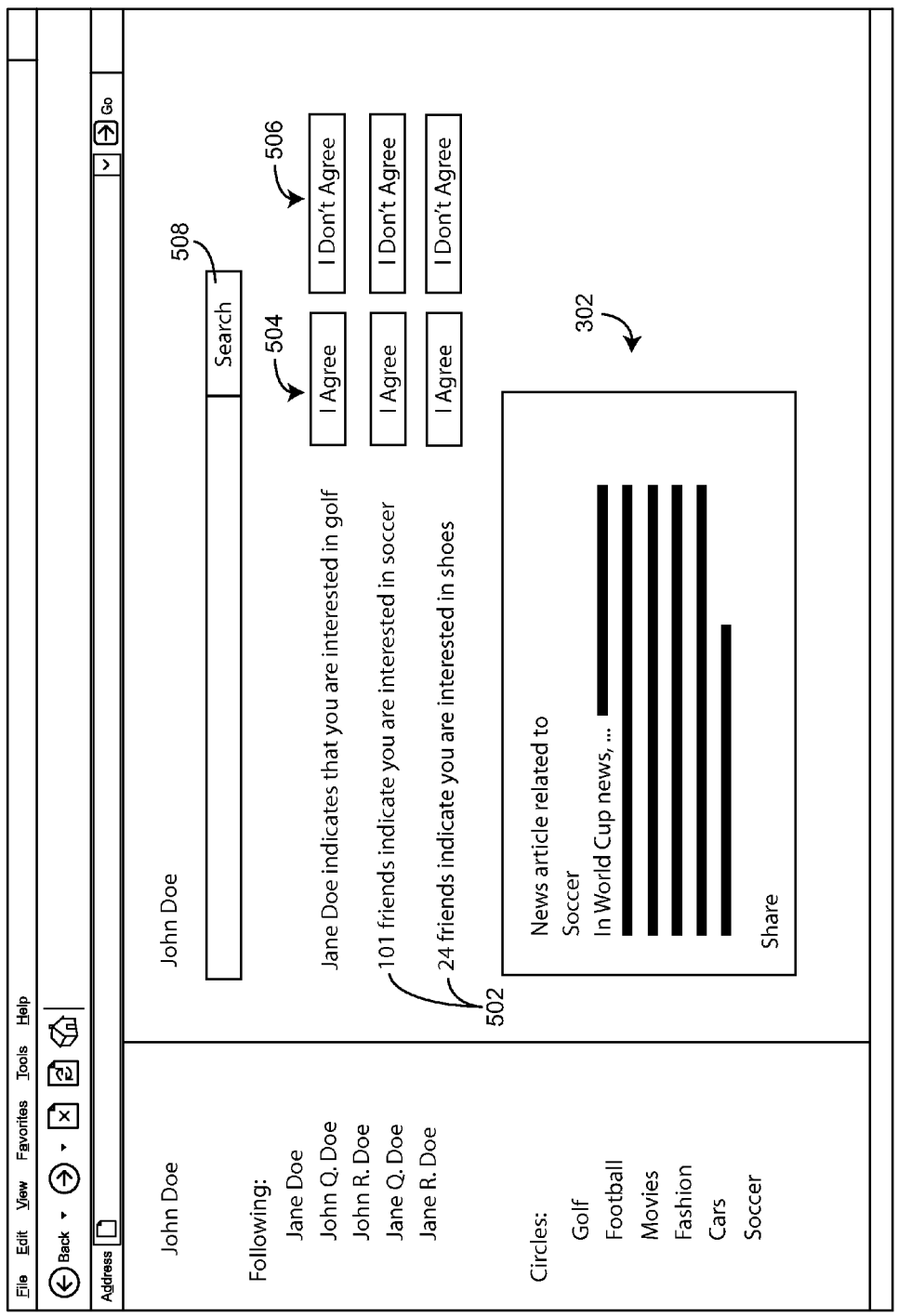
FIG. 5 illustrates an input from a second user regarding the interest data.

The weight of the interest data may also be based on (3) the input from a second user, as shown in FIG. 5.

Referring to FIG. 5, an input from a second user regarding assigned interest data is shown according to a described implementation. In some implementations, an input from the second user of a website may be received. The system may determine whether to associate the interest data with advertisements based on an input from a second user. A weight of the interest data may be determined based on the input from the second user.

As shown in the user interface 500 of FIG. 5, the second user (John Doe) may receive display data 302 relating to user data that has been identified by a first user (Jane Doe) or users that may be assigned as interest data for the second user (John Doe). The display data 302 may also include shared user data. In FIG. 5, the shared user data 302 is a news article related to soccer.

The system may receive an input from a second user. The input received from the second user may be input that the second user agrees 504 with the interest data 502 that may be assigned. The second user may agree by selecting box 504, by viewing the data, by inputting text, or by any other appropriate interaction (e.g., +1'ing, liking, etc.) If the second user agrees 504 with the interest data 502, then the interest data may be associated with advertisements provided by an advertiser, the interest data may be stored (e.g., memory, first user's user profile, second user's user profile, any other appropriate storage site), the interest data may be displayed, the interest data may update the weight of the interest data, the interest data may be used to provide other relevant content to the user, and any other appropriate actions. In some implementations, the second user may decide what advertisements he/she wants to view after agreeing with the interest data 502. In some implementations, the second user may agree with the interest data 502 and identify the interest data 502 as user data for the first user, thereby creating a similar advertisement system for the first user.

The input received from the second user may be input that the second user disagrees 506 with the interest data 502. The interest data and/or interest (if the interest data had initially been agreed to) may then be removed from the second user's profile data. In some implementations, the second user's decision may be integrated with existing advertisement preferences. The second user may have control over the specifics of what a first user may or may not do regarding identifying user data. In some implementations, the system may determine what a first user may or may not do regarding identifying user data.

Block 206 is followed by block 208, in which the interest data is associated with advertisements provided by an advertiser. For example, an advertisement for soccer cleats may appear to a second user, where a first user and/or a community of users has determined that the second user has an interest in soccer.

Block 208 is followed by block 210, in which the display data representing the advertisements associated with the interest data to the second user is displayed. The display data may be provided to the second user in a variety of ways, including, but not limited to, on the second user's profile, a message (e.g., SMS, MMS, email, etc.) to the second user, etc. The display data may be presented in a number of formats, including, but limited to, streaming content (e.g., video, picture, etc.), interactive content (e.g., games, applications, etc.) and any other appropriate content.

In some implementations, the second user may interact with the advertisement. For example, the second user may click, view, highlight etc. the advertisement. In some implementations, something of value may be identified for the first user based on the interaction. For example, a credit may be provided to the first user. "Providing" a credit may include, in various implementations, calculating a credit, applying a credit to an account, transmitting a credit to an account on a server to applied at the server, etc. In some implementations, the first user may receive additional features on a website. In some implementations, the first user may received free access to another website. In other implementations, the first user may allocate a credit to another user.

In some implementations, the first user is paid by a percentage of the CPC (cost-per-click) that relates to how much the first user contributed to the relevance of the advertisement for the second user.

Figure 6:
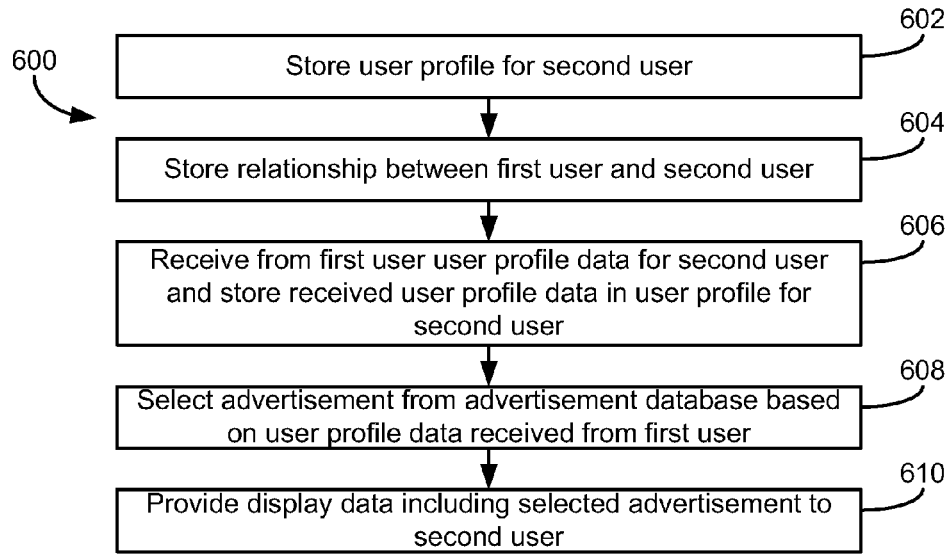
FIG. 6 is a flow diagram of a method for providing display data related to a selected advertisement in accordance with a described implementation.

Referring to FIG. 6, a flow diagram of a method for providing display data related to a selected advertisement is shown in accordance with a described implementation. The method 600 is provided by way of example, as there are a number of ways to carry out the methods according to the present disclosure. The method 600 shown in FIG. 6 may be executed or otherwise performed by one of a combination of various systems. The method 600 may be implemented by a computer, a computer program product, a computer program, a client, a server, a client-server relationship, etc. The method 300 is described herein as carried out by the system 100 of FIG. 1, by way of example.

The example method begins at block 602, in which a user profile for a second user is stored, the user profile including user profile data. In some implementations, the user profile data may include, but not limited to, data relating to demographics, location, communities, other users, etc.

Block 602 is followed by block 604, in which a relationship between a first user and a second user is stored. The relationship may be a group relationship, a content-based relationship, a social relationship, etc. The relationship may be stored within the profile data of the first user. In some implementations, the relationship may be stored within the profile data of the second user.

Block 604 is followed by block 606, in which user profile data is received from a first user for the second user and the received user profile data is stored in the user profile for the second user. In some implementations, user profile data received from a first user may be received. However, user profile data may be any content that may be stored in the user profile for the second user. For example, user profile data may include, but is not limited to, interests, books, movies, television programs, hobbies, etc.

Block 606 is followed by block 608, in which an advertisement is selected from an advertisement database based on the user profile data received from the first user. The advertisement database may be part of the advertisement management system 110. In some implementations, the database may communicate with the server. In some implementations, the advertisement database is a cloud-based database. The advertisement database may be any storage mechanism that an advertisement may be selected from.

Block 608 is followed by block 610, in which display data is provided including the selected advertisement to the second user. In some implementations, the selected advertisement may be embedded within content on the second user's user profile. In some implementations, the selected advertisement may be displayed on the second user's user profile as visual content (e.g., video(s), text, picture(s), etc.), auditory content (e.g., video(s), song(s), sound(s), etc.) or any other type of advertisement that may be displayed on the second user's user profile.

In some implementations, a request from the first user to share data with the second user may be received. Metadata for the shared data may be identified, where the user profile data received from the first user and stored in the second user's profile is based on the identified metadata for the shared data.

In some implementations, the second user may interact with the advertisement. For example, the second user may click, view, etc. the advertisement. In some implementations, something of value may be identified for the first user based on the interaction. For example, a credit may be provided to the first user. "Providing" a credit may include, in various implementations, calculating a credit, applying a credit to an account, transmitting a credit to an account on a server to applied at the server, etc.

Figure 7:
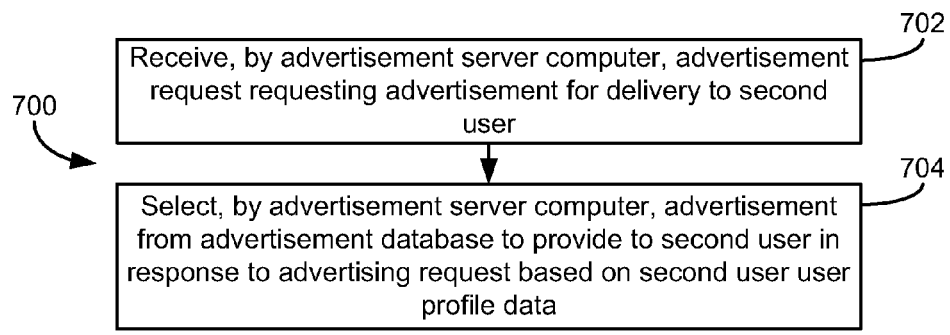
FIG. 7 is a flow diagram of a method for advertising in accordance with a described implementation.

Referring to FIG. 7, a flow diagram of a method for advertising is shown in accordance with a described implementation. The method 700 is provided by way of example, as there are a number of ways to carry out the methods according to the present disclosure. The method 700 shown in FIG. 7 may be executed or otherwise performed by one of a combination of various systems. The method may be implemented by a computer, a computer program product, a computer program, a client, a server, a client-server relationship, etc. The method 400 is described herein as carried out by the system 100 of FIG. 1, by way of example.

The example method begins at block 702, in which an advertisement server computer receives an advertisement request requesting an advertisement for delivery to a second user.

Block 702 is followed by block 704, in which an advertisement is selected by the advertisement server computer from an advertisement database to provide to a second user in response to the advertising request based on a second user user profile data. The second user user profile data is based on preferences of the second user and data received from a first user. In some implementations, the preferences of the second user are determined by a relationship between the first user and the second user. The relationship may be a group relationship, a content-based relationship, a social relationship, etc. The relationship may be used to determine the preferences of the second user in relation to selected advertisements. For example, the stronger the relationship between the first user and the second user is (e.g., spouse, sibling, parent, etc. or e.g., frequency of posts, interactions, etc.), the more influence the relationship has on the preferences of the second user.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal, e.g., a machine-generated electrical, optical, or electromagnetic signal, that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this specification may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations of the subject matter described in this specification may be implemented on a computer having a display device, e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc., by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this specification may be implemented in a computing system that includes a back-end component, e.g., as a data server, or that includes a middleware component, e.g., an application server, or that includes a front-end component, e.g., a client computer having a graphical user interface or a Web browser through which a user may interact with an implementation of the subject matter described in this specification, or any combination of one or more such back-end, middleware, or front-end components. The components of the system may be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
a processing circuit configured to:
store a relationship between a first user and a second user in a memory;
receive, from a first user, an indication of interest associated with the second user, the indication of interest providing an indication that the second user has interest in a topic of interest;
provide a notification to the second user in response to receiving the indication of interest associated with the second user;
receive an indication of acceptance by the second user in response to the notification, wherein the acceptance provides an indication that the second user is interested in the topic of interest;
add, in response to the received acceptance, the topic of interest to a profile of second user, wherein the topic of interest comprises a new topic of interest that was previously absent in the profile of the second user;
identify advertisements provided by an advertiser associated with the topic of interest; and
provide the advertisements for display to the second user.

2. The method of claim 1, wherein the indication comprises a message sent by the first user to the second user using a social networking website, wherein the message comprises shared content from the first user to the second user and is viewable by the second user.

3. The method of claim 1, wherein the relationship comprises a social relationship connection within a social network, the social relationship connection comprises at least one of a level and a degree.

4. The method of claim 1, further comprising:
receiving an input from the second user of a website; and
determining a weight of the topic of interest, based on (1) identifying data, (2) sharing data, and (3) the input from the second user, wherein the weight is stored in a memory in association with the profile of the second user, and wherein the identifying advertisements is at least in part based on the weight.

5. The method of claim 4, wherein the identifying data comprises a number of users identifying the topic of interest with respect to the second user.

6. The method of claim 4, wherein the sharing data comprises a number of users that the first user shares content with.

7. The method of claim 1, further comprising:
receiving an interaction with the advertisements from the second user, and identifying something of value for the first user based on the interaction.

8. The method of claim 7, wherein identifying something of value further comprises providing a credit to the first user.

9. A system comprising:
a processing circuit for:
storing a user profile for a second user;
storing a relationship between a first user and the second user;
receiving profile data associated with the second user from the first user, the profile data comprising an indication of a topic of interest for the second user;
receiving an indication of acceptance by the second user of the topic of interest in response to receiving the profile data;
storing, in response to the received indication, the topic of interest to the user profile for the second user, wherein the topic of interest comprises a new topic of interest that was previously absent in the user profile for the second user;
selecting an advertisement from an advertisement database based on the user profile data of the second user including the topic of interest received from the first user; and providing display data comprising the selected advertisement to the second user.

10. The system of claim 9, further comprising:
receiving a request from the first user to share data with the second user; and
identifying metadata from the shared data, wherein the profile data received from the first user is based on the identified metadata.

11. The system of claim 9, wherein the relationship comprises a social relationship connection within a social network, the social relationship connection comprises at least one of a level and a degree.

12. The system of claim 9, further comprising:
receiving an interaction with the advertisements from the second user, and identifying something of value for the first user based on the interaction.

13. The system of claim 12, wherein identifying something of value further comprises providing a credit to the first user.

14. A method for advertising over a computer network, comprising:
receiving, by an advertisement server computer, an advertisement request requesting an advertisement for delivery to a second user; and
selecting, by the advertisement server computer, an advertisement from an advertisement database to provide to the second user in response to the advertising request based on user profile data of the second user, wherein the user profile data of the second user one or more topics of interest for the second user, wherein the one or more topics of interest include at least one topic of interest identified in response to data received from a first user, wherein the identifying the topic of interest from data received from the first user comprises:
receiving the data from the first user, the data providing an indication that the second user has interest in a topic of interest; and
providing a notification to the second user in response to receiving the data; and
receiving an indication of acceptance by the second user in response to the notification, wherein the acceptance provides an indication that the second user is interested in the topic of interest.

15. The method of claim 14, wherein identifying the topic of interest from the data further comprises identifying a relationship between the first user and the second user.

16. The method of claim 15, wherein the relationship comprises a social relationship connection within a social network, the social relationship connection comprises at least one of a level and a degree.

17. The method of claim 14, wherein the data received by the first user is based on shared data between the first user and the second user.

18. The method of claim 14, further comprising receiving an interaction with the advertisement from the second user, and identifying something of value for the first user based on the interaction.

19. The method of claim 18, wherein identifying something of value further comprises providing a credit to the first user.

\* \* \* \* \*